United States Patent
MacFarlane et al.

(10) Patent No.: US 8,977,862 B2
(45) Date of Patent: *Mar. 10, 2015

(54) LOW-LEVEL CODE SIGNING MECHANISM

(75) Inventors: David MacFarlane, Waterloo (CA); Michael K. Brown, Fergus (CA)

(73) Assignee: BlackBerry Limited, Waterloo, Ontario (CA)

( * ) Notice: Subject to any disclaimer, the term of this patent is extended or adjusted under 35 U.S.C. 154(b) by 202 days.

This patent is subject to a terminal disclaimer.

(21) Appl. No.: 13/616,121

(22) Filed: Sep. 14, 2012

(65) Prior Publication Data

US 2013/0036310 A1  Feb. 7, 2013

Related U.S. Application Data

(63) Continuation of application No. 12/394,278, filed on Feb. 27, 2009, now Pat. No. 8,301,903.

(51) Int. Cl.
*H04L 29/06* (2006.01)

(52) U.S. Cl.
USPC .......................................................... 713/187

(58) Field of Classification Search
USPC ................... 713/187, 176, 168, 161; 719/315
See application file for complete search history.

(56) References Cited

U.S. PATENT DOCUMENTS

| | | | | |
|---|---|---|---|---|
| 5,692,047 | A * | 11/1997 | McManis | 713/167 |
| 5,958,050 | A * | 9/1999 | Griffin et al. | 726/1 |
| 7,227,951 | B2 * | 6/2007 | Desai et al. | 380/46 |
| 7,320,129 | B2 * | 1/2008 | Talwar et al. | 718/1 |
| 7,721,110 | B2 * | 5/2010 | Kouznetsov et al. | 713/187 |
| 8,301,903 | B2 | 10/2012 | MacFarlane et al. | |
| 2005/0154888 | A1 * | 7/2005 | Chen et al. | 713/168 |
| 2006/0064593 | A1 * | 3/2006 | Dobranski | 713/176 |
| 2006/0112198 | A1 * | 5/2006 | Kurokawa et al. | 710/19 |
| 2009/0157686 | A1 * | 6/2009 | Idicula et al. | 707/9 |
| 2010/0037065 | A1 * | 2/2010 | Dayka et al. | 713/187 |

FOREIGN PATENT DOCUMENTS

| | | |
|---|---|---|
| CA | 2694506 | 8/2010 |
| EP | 1998269 | 12/2008 |
| EP | 2224370 | 9/2010 |

OTHER PUBLICATIONS

Gong L et al. Implementing Protection Domains in the Java(TM) Development Kit 1.2, Proceedings of the Internet Society Symposium on Network and Distributed System Security, Mar. 1, 1998, San Diego CA.

Leendert Van Doorn et al. Signed Executable for Linux, Internet Citation, [Online] URL: http://www.cs.umd.edu/waa/pubs/cs4259.ps, Jan. 7, 2008.

Extended European Search Report dated Aug. 5, 2009, re: EP Patent No. 09154031.0.

Response. European Application No. 09154031.0. Dated: May 26, 2010.

(Continued)

*Primary Examiner* — Ali Abyaneh

(74) *Attorney, Agent, or Firm* — Bereskin & Parr LLP/S.E.N.C.R.L., s.r.l.

(57) ABSTRACT

Before an application is allowed to execute a secure function, code signing keys associated with the application are analyzed for correspondence with the class that contains the secure function as well as correspondence with the secure function. Optionally, code signing keys associated with the application are analyzed for correspondence with the input parameters to the function.

25 Claims, 5 Drawing Sheets

FIG. 2

(56) References Cited

OTHER PUBLICATIONS

Microsoft Corporation, "Digital Signatures for Kernel Modules on Systems Running Windows Vista", Jul. 25, 2007, pp. 1-23. Retrieved from the internet: http://www.microsoft.com/whdc/winlogo/drvsign/kmsigning/mspx.

Blackberry Developer Blog, "Code Signing: Past, Present and Future", Retrieved from the Internet: http://devblog.blackberry.com/2012/01/code-signing/.

Landry, Ted, "Frequently Asked Questions (with answers) for Java Programmers", 1998, Retrieved from the Internet: http://web.archive.org/web/20040823130611/http://www.cc.gatech.edu/classes/RWL/Projects/citation/Docs/Design/signed.applet.faq.txt.

Exam Report. European Patent Application No. 09154031.0. Dated: Sep. 6, 2012.

Response for European Patent Application No. 09154031.0, dated Jan. 7, 2013.

Office Action for Canadian Patent Application 2,694,506, dated Dec. 6, 2012.

Prosecution Documents for U.S. Appl. No. 12/394,278, issued to U.S. Patent No. 8,301,903 on Oct. 30, 2012.

Notice of Allowance for Canadian Patent Application No. 2,694,506, dated Mar. 7, 2014.

\* cited by examiner

LOW-LEVEL CODE SIGNING MECHANISM

CROSS-REFERENCE TO RELATED APPLICATION

This application is a continuation of U.S. patent application Ser. No. 12/394,278, filed Feb. 27, 2009. The entire contents of U.S. patent application Ser. No. 12/394,278 are hereby incorporated by reference.

FIELD OF THE INVENTION

The present application relates generally to cryptographically secure access to executable code and, more specifically, to controlling access to functions.

BACKGROUND OF THE INVENTION

As should be familiar to a person of ordinary skill in the art of programming, the term "application" typically refers to an executable program that carries out some functions. In object-oriented programming, a class is a programming language construct used to group related fields and methods. An application may use a class to create a new instance (object) by instantiating the class. Objects define their interaction with the outside world through the methods that they expose. A method, or function, of a class is a subroutine for carrying out a specific task, often relatively independent of the rest of the code of the class. Functions are often associated with zero or more input parameters. Advantageously, executable code for an application can be loaded onto a computing device and make use of classes that are preexisting on the device. Classes are often preexisting on a device in a runtime environment executed by an operating system on the device.

The US government has identified desired functionality for an operating system in the form of a Common Criteria Protection Profile (see www.commoncriteriaportal.org). A particular item of functionality is the ability for the operating system to ensure that a given operation does not violate a defined security policy in advance of executing the given operation. For example, prior to allowing a remote user to write to a local file, the operating system should verify that all permissions are granted accordingly.

As such, those involved in creating operating systems are always interested in improving the security of their products.

BRIEF DESCRIPTION OF THE DRAWINGS

Reference will now be made to the drawings, which show by way of example, embodiments of the invention, and in which.

DETAILED DESCRIPTION OF THE EMBODIMENTS

Figure 1:
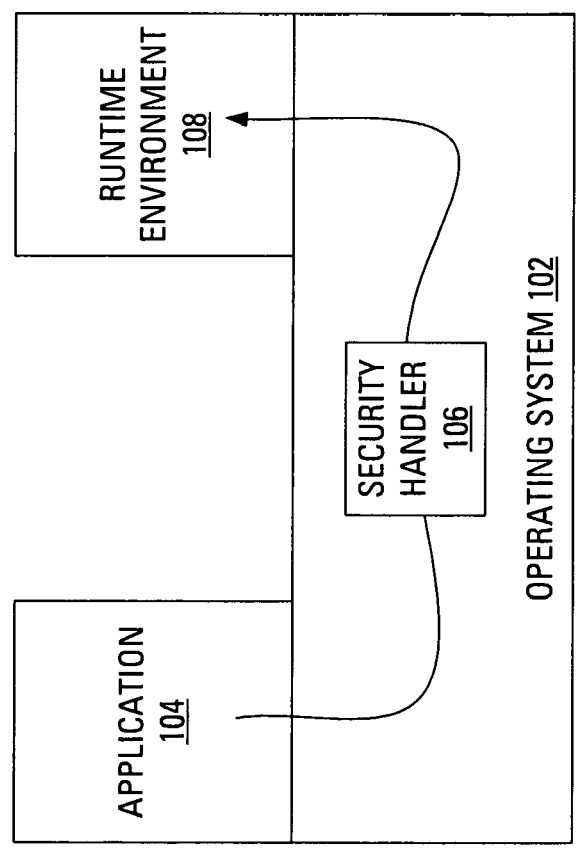
FIG. 1 illustrates code security handling in a schematic, simplified form.

FIG. 1 illustrates code security handling in a schematic, simplified form. In particular, the schematic diagram of FIG. 1 includes a representation of an operating system 102. The operating system 102 supports the execution of an application 104 and supports, where appropriate, the application 104 accessing a device Application Programming Interface (API) 108. The schematic diagram of FIG. 1 also illustrates a security handler 106, as an element of the operating system 102, and a path of a request passing from the application 104 to the device API 108.

A class may be designated as a secure class. If the application 104 is to instantiate a secure class, ensuring that instantiating the secure class does not violate a defined security policy may involve determining that the application 104 has been signed with a suitable signature. Such determining can happen at various times, for example, during boot-up or on-the-fly.

During boot-up, the security handler 106 can analyze the application 104, as well as any other applications that have been loaded onto a device. The analysis can include determining a set of classes to be accessed by each application. Where the potential to instantiate a secure class is discovered by the security handler 106 in the application 104, the security handler 106 can verify, in a manner to be discussed hereinafter, that the application 104 has been appropriately cryptographically signed and, accordingly, that the application 104 will be permitted to instantiate the secure class.

On-the-fly, the security handler 106 can receive a request from the application 104 to instantiate a secure class. In response, the security handler 106 can verify that the application 104 has been appropriately cryptographically signed and, accordingly, the security handler 106 can permit the application 104 to instantiate the secure class.

In an environment wherein at least one of the available classes is secure, the operating system of a computing device may employ the security handler 106 to handle requests from applications to instantiate various classes, including the secure class. That is, it is the task of the security handler 106 to ensure that the application 104 instantiating the secure class does not violate a defined security policy. More particularly, it is the task of the security handler 106 to verify that an application requesting access to a particular class has been signed with a signature that is associated with the particular class.

The security handler 106 may, for example, maintain a public cryptographic key associated with the particular class. A private cryptographic key corresponding to the public cryptographic key may be made available only to trusted application developers. A trusted application developer may cryptographically sign, with the private cryptographic key, an application that is to be used on the device. As such, the private cryptographic key may be referred to as a "code signing key".

To cryptographically sign application code, the application developer may, first, provide the application code as input to a hash function to obtain a digital signature. Subsequently, the application developer may encode the digital signature using the private cryptographic key. The application developer may then append the encoded digital signature, which may be called a cryptographic signature or cryptographic identifier ("ID"), to the application file.

Later, the application 104 is loaded onto a device. When the application 104 executes, the application 104 may attempt to instantiate a secure class. The attempt to instantiate the secure class may be interpreted as a request to access the secure class, which request may be handled by the security handler 106.

In operation, the security handler 106 initially receives, from the application 104, the request to access the secure class. To verify that the application 104 should be given access to the secure class, the security handler 106 obtains, perhaps from a predetermined memory location, the application code and one of the cryptographic IDs that are associated with the application and provides the application code as input to the same hash function used by the application developer. As a result of providing the application code to the hash function, the security handler 106 receives a local digital signature as the output of the hash function. The security handler 106 also decodes the cryptographic ID, using a locally-stored public key associated with the secure class, to obtain a test digital signature. The security handler 106 then compares the local digital signature to the test digital signature. If the security handler 106 determines that the local digital signature and the test digital signature are equivalent, then the security handler 106 allows the application 104 to instantiate the secure class. If the security handler 106 determines that the local digital signature and the test digital signature are different, then the security handler 106 denies the application access to the secure class.

In addition to secure classes, it is proposed herein that specific functions may be defined as secure and, furthermore, that specific input parameters to the secure function may be defined as secure. Before a security handler 106 allows an application to execute a secure function, the security handler 106 may determine that the application has been signed with the code signing keys that correspond to the class, the function and all input parameters for the secure function.

According to one aspect described herein, there is provided a method of verifying that a given application is to be permitted access to a secure function. The method may comprise obtaining code for the given application, obtaining a function cryptographic identifier associated with the given application and associated with the secure function, obtaining a local digital signature as a hash of the code for the given application and decoding the function cryptographic identifier, using a locally-stored public key associated with the secure function, to obtain a function test digital signature. The method may further comprise determining that the local digital signature matches the function test digital signature and, responsive to the determining, allowing the application to execute the secure function. In other aspects of the present application, a computing device is provided for carrying out this method and a computer readable medium is provided for adapting a processor to carry out this method.

Other aspects and features of the present invention will become apparent to those of ordinary skill in the art upon review of the following description of specific embodiments of the invention in conjunction with the accompanying figures.

In overview, a security handler 106 may allow or prevent access to classes, functions and input parameters based on cryptographic signature verification. Accordingly, only an application signed with the code signing keys that correspond to a class, a given function and all input parameters for the given function may be granted access to the given function.

Figure 2:
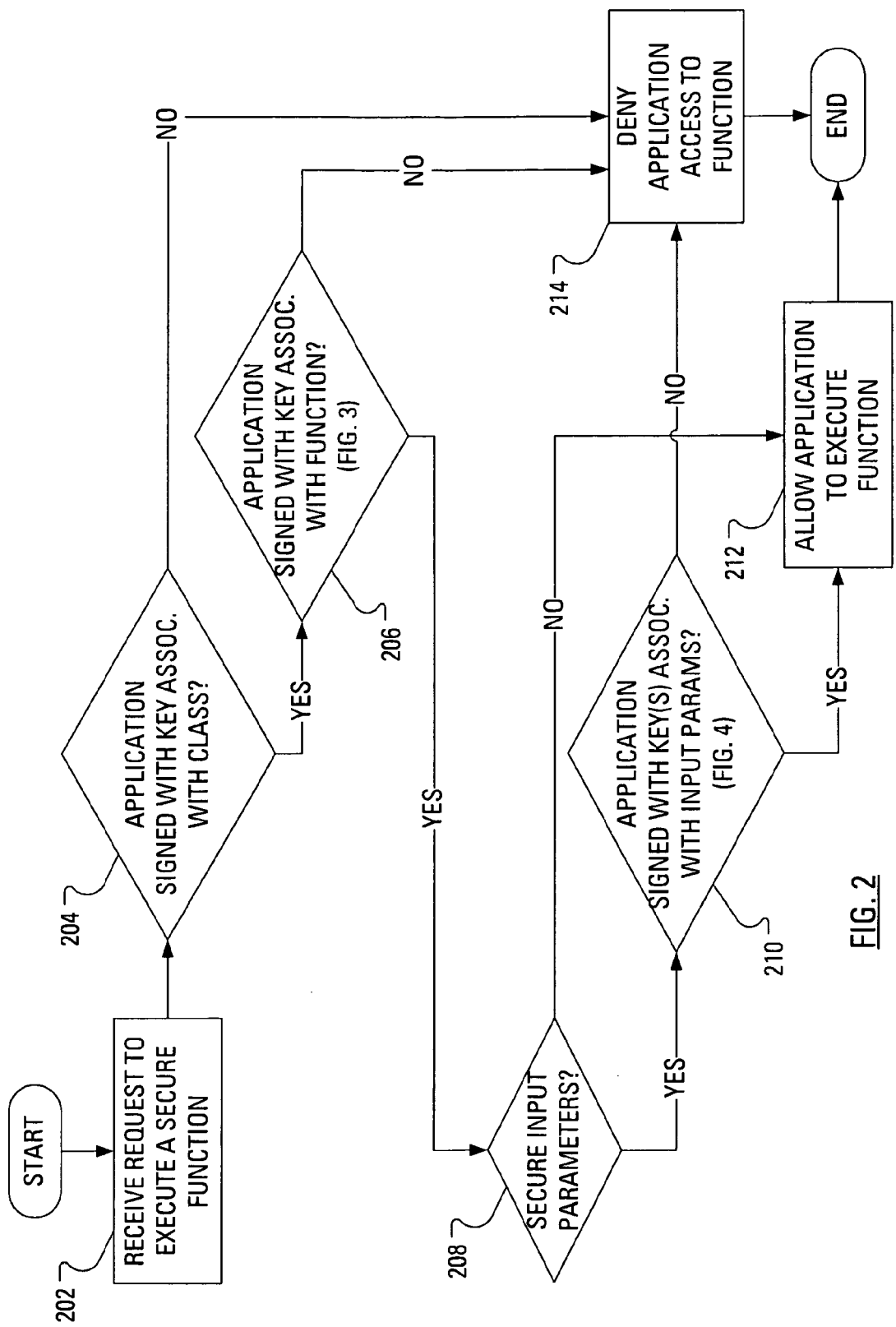
FIG. 2 illustrates example steps of a method for determining whether an application should be granted access to a secure class, a secure function and secure input parameters, according to an embodiment.

In operation, and in view of FIG. 2, the security handler 106 receives (step 202) a request indicating that the application is to execute a secure function. The security handler 106 determines (step 204) whether the application has been signed with a code signing key that is associated with the secure class of which the function is a part. Where the security handler 106 has determined (step 204) that the requesting application should be granted access to the secure class, the security handler 106 determines (step 206) whether the application has been signed with a code signing key that is associated with the secure function. A method for determining whether an application should be granted access to a secure function will be discussed hereinafter with reference to FIG. 3.

One example of a code signing scheme suitable for use in the present application is the Digital Signature Algorithm (DSA), as defined in Federal Information Processing Standard (FIPS) 186-2 Change Notice 1, "Digital Signature Standard" (for detail, see csrc.nist.gov/publications/fips/fips186-2/fips186-2-change1.pdf). The DSA specifies generation of 1024-bit signatures.

Where the security handler 106 has determined (step 206) that the requesting application should be granted access to the secure function, the security handler 106 determines (step 208) whether the secure function is associated with any secure input parameters. Where the security handler 106 has determined (step 208) that the secure function is associated with secure input parameters, the security handler 106 determines (step 210) whether the application has been signed with code signing key(s) for each of the secure input parameters. A method for determining (step 210) whether an application should be granted access to secure input parameters will be discussed hereinafter with reference to FIG. 4.

Where the security handler 106 has determined (step 208) that the secure function is not associated with secure input parameters, the security handler 106 may allow (step 212) the requesting application to execute the secure function.

Where the security handler 106 has determined (step 210) that the requesting application should be granted access to the secure input parameters, the security handler 106 may allow (step 212) the requesting application to execute the secure function.

Where the security handler 106 has determined (step 210) that the requesting application should not be granted access to the secure input parameters or where the security handler 106 has determined (step 206) that the requesting application should not be granted access to the secure function or where the security handler 106 has determined (step 204) that the requesting application should not be granted access to the secure class, the security handler 106 denies (step 214) the application access to the secure function.

Figure 3:
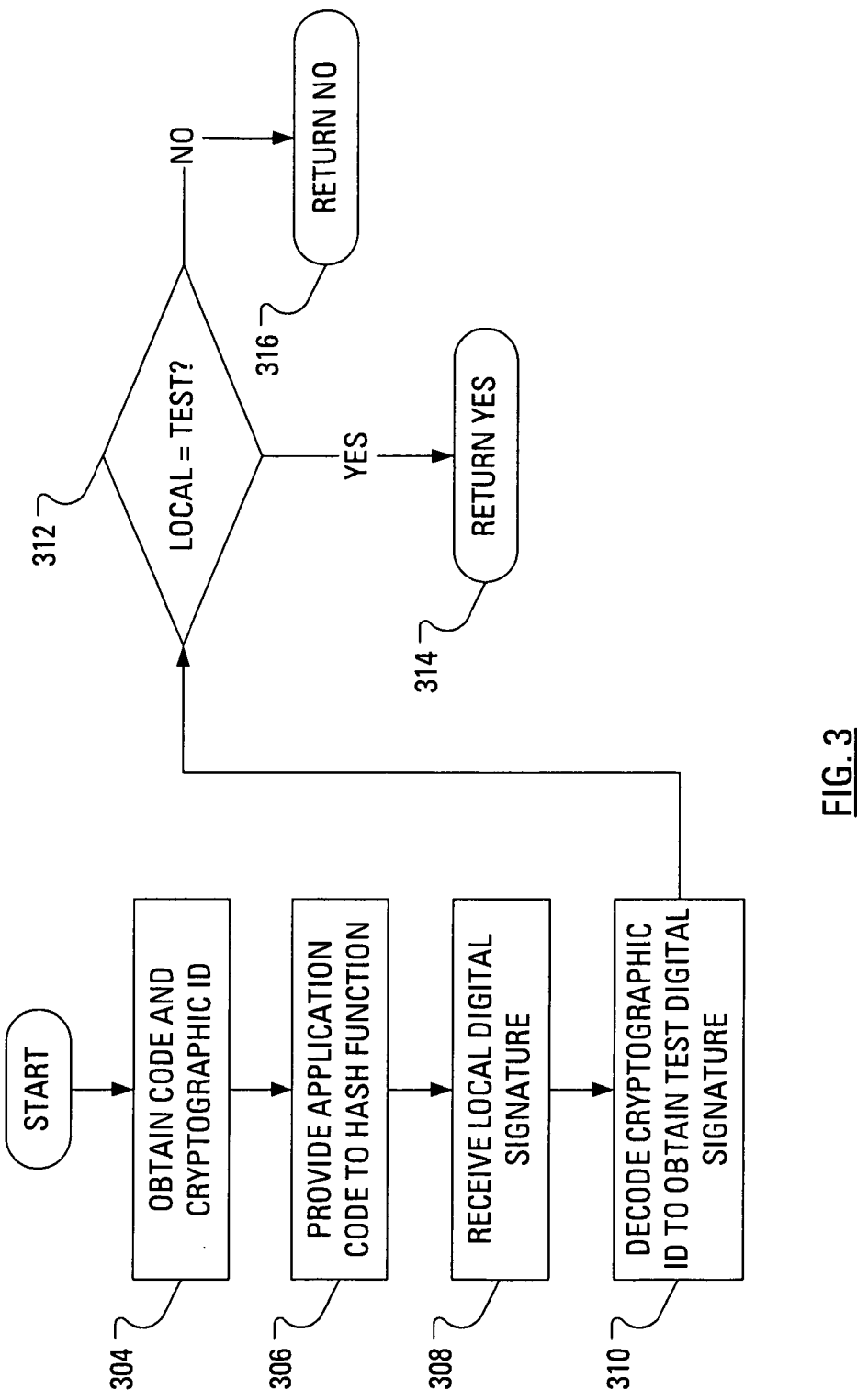
FIG. 3 illustrates example steps of a method for determining whether an application should be granted access to a secure function, according to an embodiment.

Turning to FIG. 3, to verify that the application should be given access to the secure function, the security handler 106 obtains (step 304), perhaps from a predetermined memory location, the application code and one of the cryptographic IDs that are associated with the application and provides (step 306) the application code as input to the same hash function used by the application developer. As a result of providing the application code to the hash function, the security handler 106 receives (step 308) a local digital signature as the output of the hash function. The security handler 106 also decodes (step 310) the cryptographic ID, using a locally-stored public key associated with the secure function, to obtain a test digital signature. The security handler 106 then compares (step 312) the local digital signature to the test digital signature. If the security handler 106 determines (step 312) that the local digital signature and the test digital signature are equivalent, then the security handler 106 returns (step 314) a "yes" in the determination (step 206, FIG. 2) of whether the requesting application should be granted access to the secure function. However, if the security handler 106 determines (step 312) that the local digital signature and the test digital signature are different, then the security handler 106 returns (step 316) a "no" in the determination (step 206, FIG. 2) of whether the requesting application should be granted access to the secure function.

Figure 4:
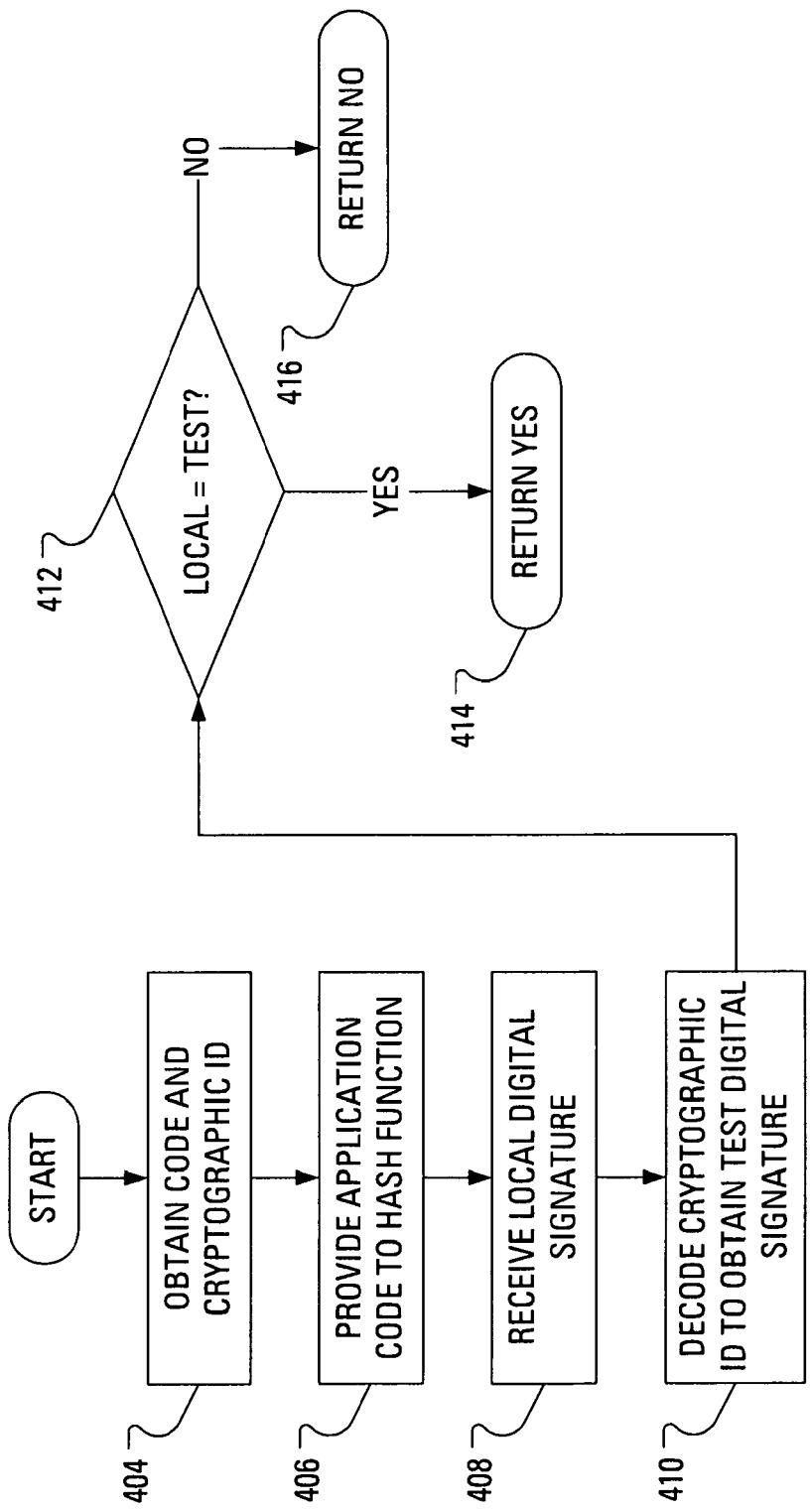
FIG. 4 illustrates example steps of a method for determining whether an application should be granted access to a secure input parameter, according to an embodiment.

Turning to FIG. 4, to verify that the application should be given access to a given secure input parameter, the security handler 106 obtains (step 404), perhaps from a predetermined memory location, the application code and one of the cryptographic IDs that are associated with the application and provides (step 406) the application code as input to the same hash function used by the application developer. As a result of providing the application code to the hash function, the security handler 106 receives (step 408) a local digital signature as the output of the hash function. The security handler 106 also decodes (step 410) the cryptographic ID, using a locally-stored public key associated with the given input parameter, to obtain a test digital signature. The security handler 106 then compares (step 412) the local digital signature to the test digital signature. If the security handler 106 determines that the local digital signature and the test digital signature are equivalent, then the security handler 106 returns (step 414) a "yes" in the determination (step 210, FIG. 2) of whether the requesting application should be granted access to the given secure input parameter. However, if the security handler 106 determines (step 412) that the local digital signature and the test digital signature are different, then the security handler 106 returns (step 416) a "no" in the determination (step 210, FIG. 2) of whether the requesting application should be granted access to the given secure input parameter.

Notably, the method of FIG. 4 may be repeated several times, once for each of a plurality of secure input parameters.

In review, each function call and the associated input parameters are included in a signed-code verification mechanism. Thus, the entities involved in the signed-code verification mechanism are classes, functions and input parameters with the following hierarchy:

a given API contains multiple classes;
each class contains multiple functions; and
each function contains zero or more input parameters.

Accordingly, to grant an application access to a particular function in the given API, a security handler confirms that the application has been signed with the code signing key that corresponds to the class, the code signing key that corresponds to the particular function and the code signing key that corresponds to each input parameter for the particular function.

An example use of this invention is a high-security environment where each of a plurality of handheld mobile communication and computing devices has two address books. It may be that a first address book of the two address books contains secret contact information and a second address book of the two address books contains non-secret contact information. The above-disclosed signed-code verification mechanism could be used to ensure that only an appropriately signed application can access a secure function used to display the secret contact information, while any e-mail application can access the non-secret contact information. Similarly, restrictions on adding, modifying, viewing and deleting entries in the address book containing secret contact information could be accomplished with methods provided in the present disclosure.

In particular, consider a mobile communication device storing two address book databases, DB1 and DB2, for secret and non-secret address book entries, respectively. The API for interaction with the address book databases includes a first function, for use in adding an entry to DB1, and a second function, for use in adding an entry to DB2. The API also includes a third function, for modifying an entry in DB1, a fourth function, for viewing an entry in DB1 and a fifth function, for deleting an entry in DB1.

Since DB1 is for secret book entries, the first, third, fourth and fifth functions are considered to be secure functions. Since DB2 is for non-secret address book entries, the second function is not considered to be a secure function. For none of the functions are the input parameters considered secure.

An address book application executing on the mobile communication device may request use of the first function to add an entry to DB1. Accordingly, the security handler 106 receives (step 202) the request indicating that the address book application is to execute the (secure) first function. The security handler 106 determines (step 204) whether the address book application has been signed with a code signing key that is associated with the secure class of which the first function is a part. Where the security handler 106 has determined (step 204) that the address book application should be granted access to the secure class, the security handler 106 determines (step 206) whether the address book application has been signed with a code signing key that is associated with the first function. A method for determining whether an application should be granted access to a secure function has been discussed hereinbefore with reference to FIG. 3.

Where the security handler 106 has determined (step 206) that the address book application should be granted access to the first function, the security handler 106 determines (step 208) whether the secure function is associated with any secure input parameters.

Where the security handler 106 has determined (step 208) that the first function is not associated with secure input parameters, the security handler 106 may allow (step 212) the address book application to execute the first function to add an entry to DB1.

Notably, in the context of using the second function to add an entry to DB2, the address book application is not restricted. Accordingly, a digital signature is not required.

Where the security handler 106 has determined (step 204) that the address book application should be granted access to the secure class to which the third function belongs, the security handler 106 determines (step 206) whether the address book application has been signed with a code signing key that is associated with the third function.

Where the security handler 106 has determined (step 208) that the third function is not associated with secure input parameters, the security handler 106 may allow (step 212) the address book application to execute the third function to modify an entry to DB1.

Where the security handler 106 has determined (step 204) that the address book application should be granted access to the secure class to which the fourth function belongs, the security handler 106 determines (step 206) whether the address book application has been signed with a code signing key that is associated with the fourth function.

Where the security handler 106 has determined (step 208) that the fourth function is not associated with secure input parameters, the security handler 106 may allow (step 212) the address book application to execute the fourth function to view an entry to DB1.

Where the security handler 106 has determined (step 204) that the address book application should be granted access to the secure class to which the fifth function belongs, the security handler 106 determines (step 206) whether the address book application has been signed with a code signing key that is associated with the fifth function.

Where the security handler 106 has determined (step 208) that the fifth function is not associated with secure input parameters, the security handler 106 may allow (step 212) the address book application to execute the fifth function to delete an entry to DB1.

For an additional example, consider a mobile communication device with multiple web browsing applications. An API on the mobile communication device may include a first networking function to open a communication channel to an internal corporate network. Logically, the first networking function is a secure function. Similarly, an API on the mobile communication device may include a second networking function to open a communication channel to an external network. Logically, the second networking function is not a secure function. According to aspects of the present disclosure, the security handler will allow any of the multiple web browsing applications to use the second networking function to open a communication channel to server on an external network to request and receive a web page. In contrast, only those web browsing applications, among the multiple web browsing applications, that are associated with an appropriate digital signature are allowed, by the security handler, to open a communication channel to a server on the internal corporate network to request and receive an internal web page.

Figure 5:
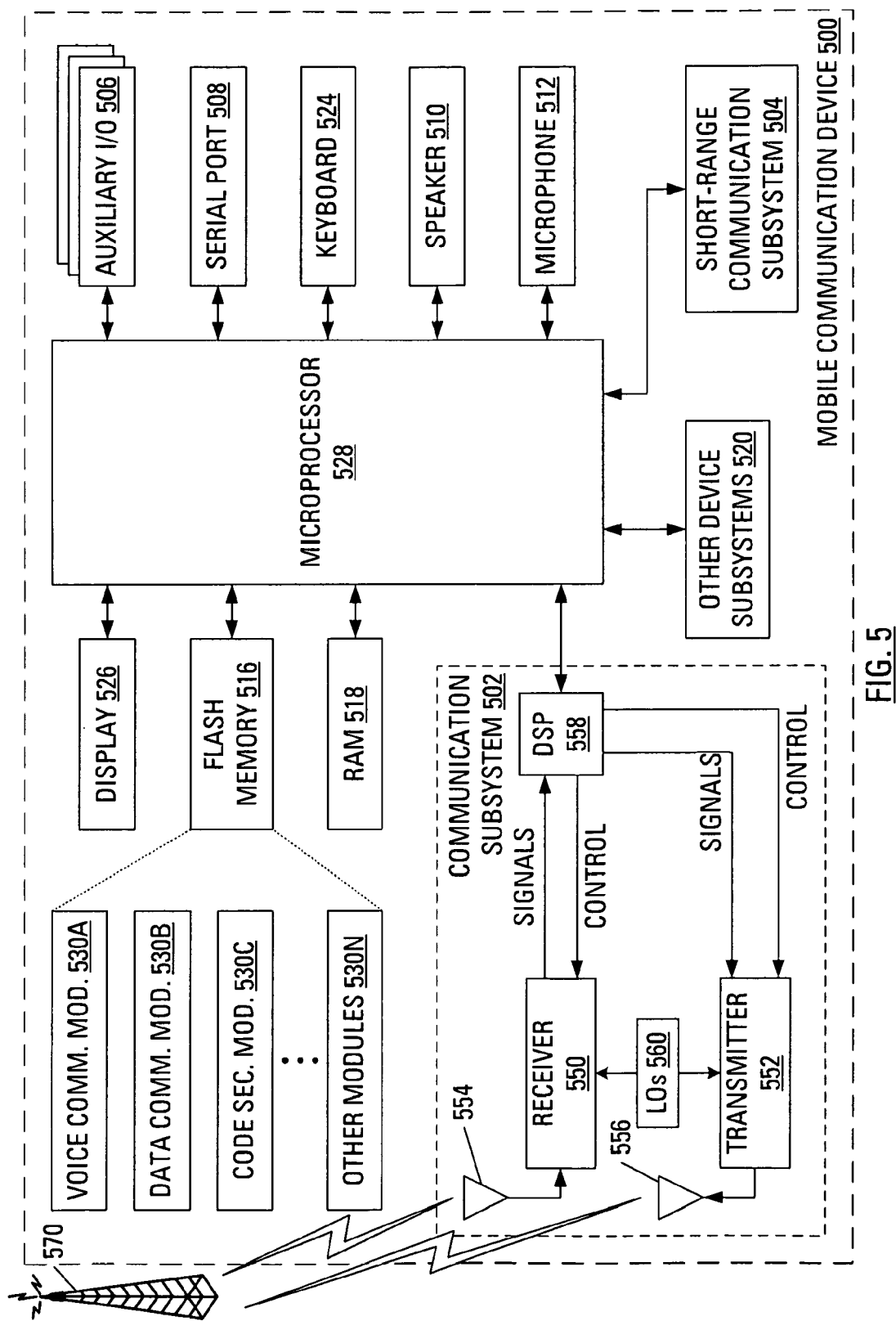
FIG. 5 illustrates an operational block representation of a mobile communication device for carrying out methods of FIGS. 2, 3 and 4 according to one embodiment.

FIG. 5 illustrates a mobile communication device 500 as an example of a device that may carry out the method of FIG. 1. The mobile communication device 500 includes a housing, an input device (e.g., a keyboard 524 having a plurality of keys) and an output device (e.g., a display 526), which may be a full graphic, or full color, Liquid Crystal Display (LCD). In some embodiments, the display 526 may comprise a touchscreen display. In such embodiments, the keyboard 524 may comprise a virtual keyboard. Other types of output devices may alternatively be utilized. A processing device (a microprocessor 528) is shown schematically in FIG. 5 as coupled between the keyboard 524 and the display 526. The microprocessor 528 controls the operation of the display 526, as well as the overall operation of the mobile communication device 500, in part, responsive to actuation of the keys on the keyboard 524 by a user.

The housing may be elongated vertically, or may take on other sizes and shapes (including clamshell housing structures). Where the keyboard 524 includes keys that are associated with at least one alphabetic character and at least one numeric character, the keyboard 524 may include a mode selection key, or other hardware or software, for switching between alphabetic entry and numeric entry.

In addition to the microprocessor 528, other parts of the mobile communication device 500 are shown schematically in FIG. 5. These may include a communications subsystem 502, a short-range communications subsystem 504, the keyboard 524 and the display 526. The mobile communication device 106 may further include other input/output devices, such as a set of auxiliary I/O devices 506, a serial port 508, a speaker 510 and a microphone 512. The mobile communication device 106 may further include memory devices including a flash memory 516 and a Random Access Memory (RAM) 518 and various other device subsystems 520. The mobile communication device 500 may comprise a two-way radio frequency (RF) communication device having voice and data communication capabilities. In addition, the mobile communication device 500 may have the capability to communicate with other computer systems via the Internet.

Operating system software executed by the microprocessor 528 may be stored in a computer readable medium, such as the flash memory 516, but may be stored in other types of memory devices, such as a read only memory (ROM) or similar storage element. In addition, system software, specific device applications, or parts thereof, may be temporarily loaded into a volatile store, such as the RAM 518. Communication signals received by the mobile device may also be stored to the RAM 518.

The microprocessor 528, in addition to its operating system functions, enables execution of software applications on the mobile communication device 500. A predetermined set of software applications that control basic device operations, such as a voice communications module 530A and a data communications module 530B, may be installed on the mobile communication device 500 during manufacture. A code security module 530C may also be installed on the mobile communication device 500 during manufacture, to implement aspects of the present disclosure. As well, additional software modules, illustrated as an other software module 530N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 570 represented by a radio tower. The data items managed by the PIM application may be seamlessly integrated, synchronized and updated via the wireless carrier network 570 with the device user's corresponding data items stored or associated with a host computer system.

Communication functions, including data and voice communications, are performed through the communication subsystem 502 and, possibly, through the short-range communications subsystem 504. The communication subsystem 502 includes a receiver 550, a transmitter 552 and one or more antennas, illustrated as a receive antenna 554 and a transmit antenna 556. In addition, the communication subsystem 502 also includes a processing module, such as a digital signal processor (DSP) 558, and local oscillators (LOs) 560. The specific design and implementation of the communication subsystem 502 is dependent upon the communication network in which the mobile communication device 500 is intended to operate. For example, the communication subsystem 502 of the mobile communication device 500 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), etc. Other types of data and voice networks, both separate and integrated, may also be utilized with the mobile communication device 500.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network.

Despite identifying a subscriber by SIM, mobile devices within GSM/GPRS networks are uniquely identified using an International Mobile Equipment Identity (IMEI) number.

When network registration or activation procedures have been completed, the mobile communication device 500 may send and receive communication signals over the wireless carrier network 570. Signals received from the wireless carrier network 570 by the receive antenna 554 are routed to the receiver 550, which provides for signal amplification, frequency down conversion, filtering, channel selection, etc., and may also provide analog to digital conversion. Analog-to-digital conversion of the received signal allows the DSP 558 to perform more complex communication functions, such as demodulation and decoding. In a similar manner, signals to be transmitted to the wireless carrier network 570 are processed (e.g., modulated and encoded) by the DSP 558 and are then provided to the transmitter 552 for digital to analog conversion, frequency up conversion, filtering, amplification and transmission to the wireless carrier network 570 (or networks) via the transmit antenna 556.

In addition to processing communication signals, the DSP 558 provides for control of the receiver 550 and the transmitter 552. For example, gains applied to communication signals in the receiver 550 and the transmitter 552 may be adaptively controlled through automatic gain control algorithms implemented in the DSP 558.

In a data communication mode, a received signal, such as a text message or web page download, is processed by the communication subsystem 502 and is input to the microprocessor 528. The received signal is then further processed by the microprocessor 528 for output to the display 526, or alternatively to some auxiliary I/O devices 506. A device user may also compose data items, such as e-mail messages, using the keyboard 524 and/or some other auxiliary I/O device 506, such as a touchpad, a rocker switch, a thumb-wheel, a trackball, a touchscreen, or some other type of input device. The composed data items may then be transmitted over the wireless carrier network 570 via the communication subsystem 502.

In a voice communication mode, overall operation of the device is substantially similar to the data communication mode, except that received signals are output to a speaker 510, and signals for transmission are generated by a microphone 512. Alternative voice or audio I/O subsystems, such as a voice message recording subsystem, may also be implemented on the mobile communication device 500. In addition, the display 526 may also be utilized in voice communication mode, for example, to display the identity of a calling party, the duration of a voice call, or other voice call related information.

The short-range communications subsystem 504 enables communication between the mobile communication device 500 and other proximate systems or devices, which need not necessarily be similar devices. For example, the short-range communications subsystem 504 may include an infrared device and associated circuits and components, or a Bluetooth™ communication module to provide for communication with similarly-enabled systems and devices.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of controlling access, by an application, to a secure function of a secure class, the secure function being available for execution on a computing device, the method comprising:
   determining whether the application includes a first authentic digital signature generated using a function-specific code signing key, wherein the first authentic digital signature comprises a hash of the application, and the hash is encrypted with the function-specific code signing key, the function-specific code signing key being associated with the secure function;
   determining whether the application includes a second authentic digital signature generated using a class-specific code signing key, wherein the second authentic digital signature comprises a hash of the application, and the hash is encrypted with the class-specific code signing key, the class-specific code signing key being associated with the secure class; and
   controlling access to the secure function of the secure class based on whether the application includes both the first authentic digital signature and the second authentic digital signature.

2. The method of claim 1, wherein the function-specific code signing key comprises a private key that corresponds to a public key associated with the secure function.

3. The method of claim 1, wherein when controlling access to the secure function, the method further comprises:
   generating a local hash of the application;
   decrypting, using a public key associated with the secure function, the first authentic digital signature to obtain a test hash;
   determining whether the test hash matches the local hash; and
   if the test hash matches the local hash, allowing the application to access the secure function.

4. The method of claim 1, wherein the class-specific code signing key comprises a private key that corresponds to a public key associated with the secure class.

5. The method of claim 1, wherein the secure function belongs to an Application Programming Interface (API).

6. The method of claim 1, wherein the secure function provides access to contact information.

7. The method of claim 1, wherein the secure function comprises reading contact information.

8. The method of claim 1, wherein the secure function comprises writing contact information.

9. The method of claim 1, wherein the application comprises a web browser application, and the secure function comprises a networking function.

10. The method of claim 9, wherein the networking function is accessible by the web browser application to request an internal web page on an internal corporate network.

11. A computing device configured to control access, by an application, to a secure function of a secure class, the secure function being available for execution on the computing device, the computing device comprising:
   a processor and a memory storing instructions executable by the processor, wherein the processor is configured to:
   determine whether the application includes a first authentic digital signature generated using a function-specific code signing key, wherein the first authentic digital signature comprises a hash of the application, and the hash is encrypted with the function-specific code signing key, the function-specific code signing key being associated with the secure function;

determine whether the application includes a second authentic digital signature generated using a class-specific code signing key, wherein the second authentic digital signature comprises a hash of the application, and the hash is encrypted with the class-specific code signing key, the class-specific code signing key being associated with the secure class; and control access to the secure function of the secure class based on whether the application includes both the first authentic digital signature and the second authentic digital signature.

12. The computing device of claim 11, wherein the function-specific code signing key comprises a private key that corresponds to a public key associated with the secure function.

13. The computing device of claim 11, wherein when controlling access to the secure function, the processor is further configured to:
generate a local hash of the application;
decrypt, using a public key associated with the secure function, the first authentic digital signature to obtain a test hash;
determine whether the test hash matches the local hash; and
if the test hash matches the local hash, allow the application to access the secure function.

14. The computing device of claim 11, wherein the class-specific code signing key comprises a private key that corresponds to a public key associated with the secure class.

15. The computing device of claim 11, wherein the secure function belongs to an Application Programming Interface (API).

16. The computing device of claim 11, wherein the secure function provides access to contact information.

17. The computing device of claim 11, wherein the secure function comprises reading contact information.

18. The computing device of claim 11, wherein the secure function comprises writing contact information.

19. The computing device of claim 11, wherein the application comprises a web browser application, and the secure function comprises a networking function.

20. The computing device of claim 19, wherein the networking function is accessible by the web browser application to request an internal web page on an internal corporate network.

21. A non-transitory computer readable medium storing instructions that, when executed by a processor of a computing device, cause the computing device to control access, by an application, to a secure function of a secure class, the secure function being available for execution on the computing device, the instructions comprising:
instructions for determining whether the application includes a first authentic digital signature generated using a function-specific code signing key, wherein the first authentic digital signature comprises a hash of the application, and the hash is encrypted with the function-specific code signing key, the function-specific code signing key being associated with the secure function;
instructions for determining whether the application includes a second authentic digital signature generated using a class-specific code signing key, wherein the second authentic digital signature comprises a hash of the application, and the hash is encrypted with the class-specific code signing key, the class-specific code signing key being associated with the secure class; and
instructions for controlling access to the secure function of the secure class based on whether the application includes both the first authentic digital signature and the second authentic digital signature.

22. The computer readable medium of claim 21, wherein the function-specific code signing key comprises a private key that corresponds to a public key associated with the secure function.

23. The computer readable medium of claim 21, wherein the class-specific code signing key comprises a private key that corresponds to a public key associated with the secure class.

24. The computer readable medium of claim 21, wherein the secure function belongs to an Application Programming Interface (API).

25. The computer readable medium of claim 21, wherein the secure function provides access to contact information.

* * * * *